May 3, 1938.  A. G. GURRIES ET AL  2,115,950
HYDRAULIC CONTROL VALVE
Filed Feb. 19, 1937   2 Sheets-Sheet 1
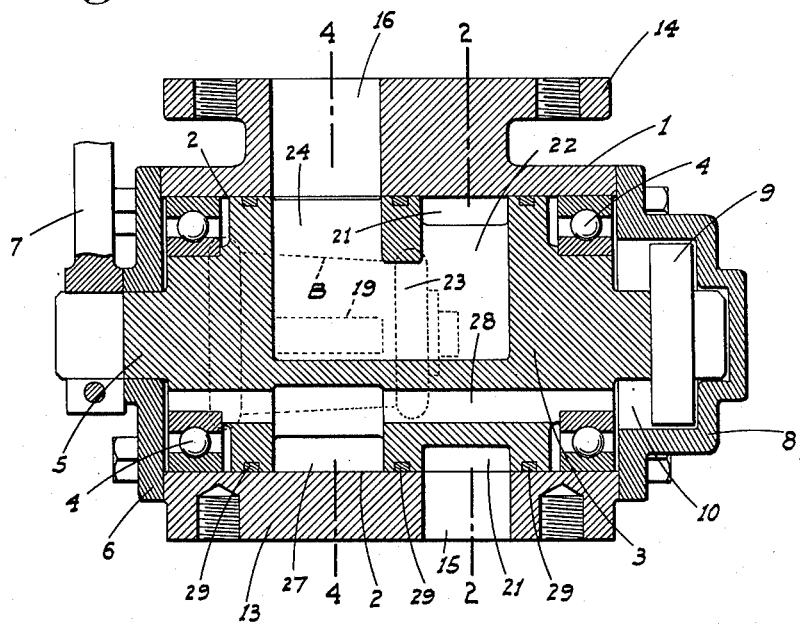
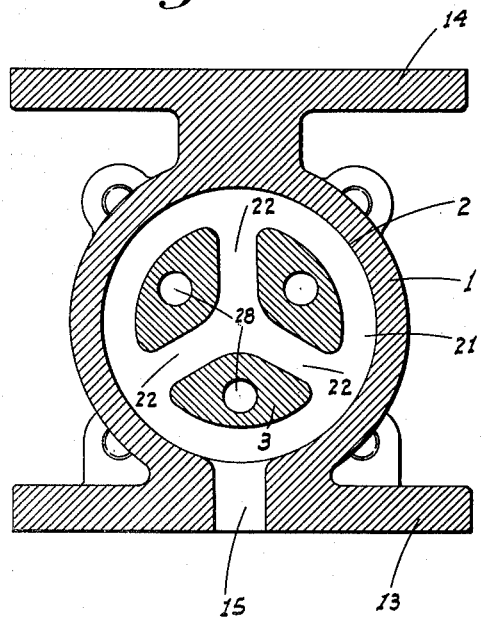
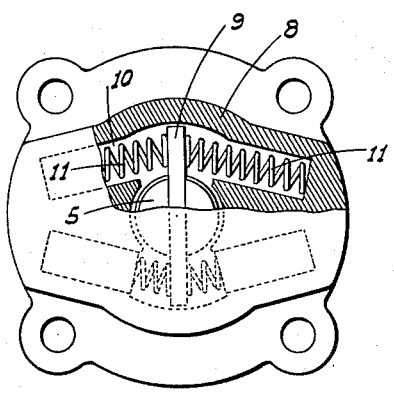
INVENTORS
A.G. Gurries
J. A Bussert
BY
ATTORNEY

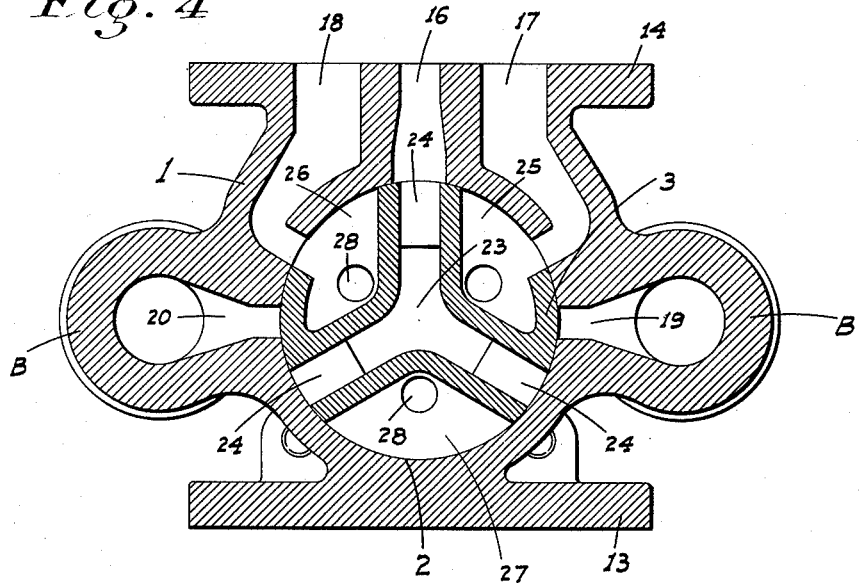
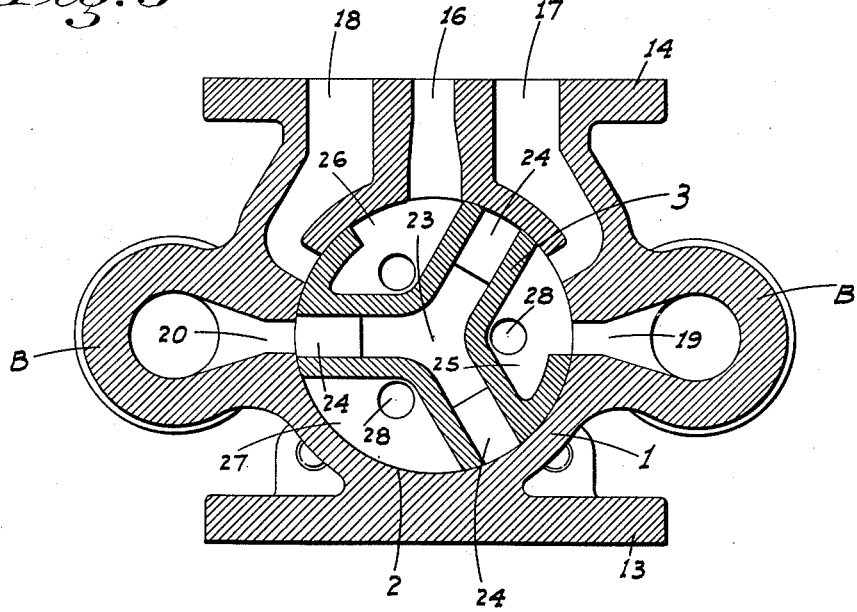

Patented May 3, 1938

2,115,950

UNITED STATES PATENT OFFICE 2,115,950

HYDRAULIC CONTROL VALVE

Albert G. Gurries and James A. Bussert, Gilroy, Calif., assignors to "Be Ge" Manufacturing and Welding Works, a copartnership comprising Albert G. Gurries and James A. Bussert, Gilroy, Calif.

Application February 19, 1937, Serial No. 126,608

4 Claims. (Cl. 251—104)

This invention relates in general to a hydraulic control valve of the manually operative type, and in particular relates to a hydraulic control valve for use on tractors to control hydraulic actuating mechanisms on implements, such as scrapers being drawn by the tractor.

The hydraulic pressure usually employed for such purpose is quite high and, as a result, much difficulty has been encountered with the control valves heretofore used, the difficulty residing especially in the inability to obtain ease and nicety of operation.

The principal object of our invention is to provide a hydraulic control valve so constructed that, even when used under extreme pressure conditions, the valve will be so balanced that "finger tip" manipulation may be had as well as precise control over the hydraulic actuating mechanisms on the drawn implement.

A further object of our invention is to provide an effective spring return unit comprising few parts and yet being effective to normally maintain the valve in an inoperative or by-pass position.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a sectional elevation of our improved control valve.

Figure 2 is a cross section taken on line 2—2 of Fig. 1.

Figure 3 is an end view, partly in section, of the cap which encloses the spring return unit.

Figure 4 is a cross section taken on line 4—4 of Fig. 1 and illustrating the valve in a closed or by-passing position.

Figure 5 is a similar view but with the valve in an open position.

Referring now more particularly to the characters of reference on the drawings, the device comprises a shell or body 1 formed with a bore 2 in which a cylindrical plug valve 3 is turnably mounted. The plug valve is journaled at each end on ball bearings 4; stems 5 on each end of the plug valve projecting beyond the ends of the body 1. At one end of the body, a closure cap 6 is secured thereto and surrounds the adjacent stem 5, and a suitable control lever 7 is mounted on the projecting portion of the stem. The other end of the body is enclosed by another cap 8 adapted to enclose the entire adjacent stem 5.

The spring return unit is disposed in cap 8 and comprises a cross bar 9 carried in a slot in stem 5 and projecting beyond the stem on both sides thereof into chambers 10 formed in the cap 8. Opposed pockets 11 communicate with chambers 10 adjacent each end of cross bar 9; compression springs 12 in said pockets engaging the cross bar at each end on both sides. This spring return unit maintains the plug valve in a neutral closed position as will hereinafter appear and allows the plug valve to be turned approximately 30° in each direction against the compression of the springs. As caps 6 and 8 are interchangeable and stems 5 are identical, the spring return unit may be used on either end and the control lever being mounted on the other end.

The body 1 is flanged on opposed sides, as at 13 and 14 respectively, for convenience of mounting. The flange 13 is formed with a port 15 which communicates with the bore 2 in body 1, while the flange 14 is formed with a central port 16 communicating with the bore and spaced longitudinally of port 15 and opposite (180°) therefrom. The flange 14 is also provided with ports 17 and 18 which enter the bore between the port 16 and other opposed ports 19 and 20 formed in the body, each being 90° from the port 16. The ports 17 and 18 enter the bore approximately 30° from the ports 19 and 20 respectively; the ports numbered 16 to 20 inclusive all being disposed in the same plane transversely of the body 1. Double ended coupling bosses B are formed on opposite sides of the body and communicate with ports 19 and 20.

The plug valve is formed with a continuous circumferential groove 21 which registers with port 15 and which port is the intake or fluid supply port. Three radial passages 22, spaced 120° apart, lead from groove 21 to one end of a central longitudinal passage 23 communicating at its other end with three other radial passages 24 which extend to the periphery of the plug valve in the same transverse plane as ports numbered 16 to 20 inclusive.

When the valve is in a closed or by-passing position one of the passages 24 is in register with passage 16 while the other two passages 24 are clear of ports 19 and 20 as shown in Fig. 4. The plug valve to each side of said one passage 24 but in the same transverse plane is formed with chambers 25 and 26 open to the periphery of the plug valve, the extent of opening being such that when the plug valve is turned sufficiently to move said one passage 24 out of register with port 16 and to bring one of the other remaining passages 24 into register with one of the ports 19 or 20, the one of said chambers adjacent the other passage 24 will move into register with the other of the ports 19 or 20 and the other of said chambers registers with port 16, as shown in Fig. 5. To maintain proper balance of the plug valve, another chamber 27 is formed in the valve but does not at any time move into register with any port. Longitudinal bleed passages 28 are in the plug valve from end to end, each one of these bleed passages 28 passing through one of chambers 25, 26 or 27. The plug valve is provided at spaced points in its length with suitable piston type sealing rings 29. Any fluid that escapes by the rings to the end of the valve will find its way into longitudinal passages 28 and be by-passed into chamber 25 or 26. Bleed passages 28 are also open to the ball bearings, and keep the same lubricated.

*Operation*

In use our improved control valve is mounted on a tractor in such position that the hydraulic fluid from the pump is fed under high pressure into port 15, about the circumferential groove 21, through radial passages 22 and central passage 23 and into radial passages 24. The distribution of the fluid under high pressure in the valve is such, due to the continuous circumferential groove and equally spaced radial passages, that there is no thrust of the plug valve in any direction against the bore 2 in body 1. The plug valve, in effect, floats in the bore and due to its nicety of balance even when the fluid therein is under high pressure, the plug valve may be rotated with great ease. The operator can readily operate the valve with one hand.

In a closed position (the normal position of the plug valve under the influence of the spring return unit) the high pressure fluid therein is continuously by-passed into port 16 from the passage 24 which registers with said port. The body is mounted so that ports 16, 17 and 18 communicate with the fluid supply tank (not shown). Thus, fluid by-passing into these ports returns to the supply tank. Such closed position is shown in Fig. 4.

The coupling bosses B are each connected by flexible hoses (not shown) to the hydraulic control mechanisms on the drawn implement. By turning the plug valve in one direction approximately 30°, as shown in Fig. 5, one of the passages 24 will register with port 20 and fluid, under pressure, will feed through the adjacent coupling boss and into the connected flexible hose. At the same time, chamber 25 registers with port 19 and relieves any fluid pressure which may there exist, the chamber being also in communication with port 17 through which the fluid may feed or by-pass back into the supply tank. Also, chamber 26 then registers with port 16 to permit escape of any fluid which may have accumulated in said chamber.

When the plug valve is turned 30° in the other direction from a valve closed position, fluid under pressure is fed to the other coupling boss and the chambers 25 and 26 are reversed in their respective positions.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A valve unit to control fluid under pressure comprising a body having a bore and formed with a feed port and separate by-pass ports circumferentially spaced from each other and from the feed port and all communicating with the bore, a valve plug turnably mounted in the bore and having a pair of passages connected at their inner ends and circumferentially spaced at the periphery of the plug, and a chamber open to the periphery of the plug between the peripheral ends of the passages; said chamber and one passage being in separate register with the by-pass ports while the other passage and feed port are closed off when the plug is in a neutral position; the feed port and one by-pass port being in common register with the chamber while both passages are closed off when the plug is turned a predetermined amount in one direction from a neutral position; and the chamber being in register with the other by-pass port and the other passage in register with the feed port while said one passage is closed when the plug is turned a predetermined amount in the opposite direction from said neutral position, there being other passage means in the valve unit to supply fluid under pressure to said passages.

2. A structure as in claim 1, in which the plug valve is formed with an additional passage extending from said chamber to the opposite ends of the plug.

3. In a fluid control valve including a body having a bore therein, a plug valve rotatably mounted in the bore, a stem projecting from one end of the plug valve, and a cap secured to the body and enclosing the stem; a cross bar fixed with the stem and projecting beyond the stem on opposite sides and a pair of compression springs mounted in the cap adjacent each projecting portion of the bar, the springs of each pair engaging the cross bar on opposite sides.

4. In a valve unit adapted to control fluid under high pressure, a body having a bore therein, a plug valve rotatably mounted in the bore, a separate intake, feed and by-pass port formed in the body and in communication with the bore, and passage means in the plug valve arranged to selectively afford communication between the intake and feed port, and the intake and by-pass ports upon rotation of the plug valve; the passage means being open to the periphery of the plug valve at such points that the pressure of fluid in said passage means will maintain the plug valve balanced in the bore and without side thrust.

JAMES A. BUSSERT.
ALBERT G. GURRIES.